UNITED STATES PATENT OFFICE 2,787,578
Patented Apr. 2, 1957

2,787,578

RECOVERY AND PURIFICATION OF VITAMIN B12

Edwin N. Lightfoot, Jr., Madison, Wis., and Roy J. Taylor, Flushing, N. Y., assignors to Chas. Pfizer & Co., Inc., Brooklyn, N. Y., a corporation of Delaware No Drawing. Application July 6, 1954,
Serial No. 441,662

10 Claims. (Cl. 167—81)

This invention relates to methods for isolating and purifying vitamin B12, and particularly to the recovery of this highly valuable vitamin from aqueous solutions derived from those microorganism fermentation broths in which vitamin B12 values are elaborated.

This is a continuation-in-part application based on application Serial No. 221,542, filed on April 17, 1951, by Edwin N. Lightfoot, Jr., et al.

Except as otherwise indicated, the term "vitamin B12 active materials" or "vitamin B12" is used herein in the customary manner to include broadly vitamin B12 itself, its naturally occurring variants like vitamin B12b, variants derived from these by simple chemical reactions like hydrogenation (e. g. vitamin B12a), and other vitamin B12 types. The most desirable form of the vitamin in commerce and therapy is the pure vitamin B12, but it has always proved exceedingly difficult both to recover the vitamin values from impure liver extracts or bacterial culture media, and to isolate this pure form from other B12 compounds and derivatives.

The present invention provides a process which overcomes these and other difficulties and allows the ready isolation and purification of vitamin B12 from impure sources. Broadly speaking, the invention comprises treating an impure aqueous solution containing the vitamin B12 active materials with a cyanide salt and then extracting the vitamin into an alcohol-type solvent from which it is reextracted into water and then into a normally liquid, aliphatic monocarboxylic acid containing substantially between 4 and 14 carbon atoms. Alternatively, the cyanide-treated impure aqueous solution, which may be fermentation broth or a crude concentrate obtained by known procedures from fermentation broth, may be extracted directly with the monocarboxylic acid or with a solution of the monocarboxylic acid in a water-immiscible alcohol-type solvent. The extraction of cyanide-treated vitamin B12 values with a normally liquid, aliphatic monocarboxylic acid has distinct and unexpected advantages over the use of the extraction method on uncyanided vitamin materials and over merely treating the crude vitamin with cyanide and then recovering the resulting product by conventional methods, such as precipitation with a non-solvent or extraction with solvents other than organic acids. The use of the cyanide treatment seems to impart a particular selectivity to the carboxylic acid extraction such that an unusual degree of purity enhancement is achieved. This high degree of improvement in quality is not achieved with liquid carboxylic acid extraction of uncyanided material, although a very definite increase in purity is noted. This effect has been confirmed by comparison of the quality of vitamin B12 before and after extraction with a liquid carboxylic acid with and without treatment with cyanide. The quality of the material extracted after cyanide treatment is definitely superior and the ease of extraction as indicated by the distribution coefficient is definitely increased. This, of course, allows for more efficient recovery of the valuable vitamin products and allows for the utilization of smaller volumes of extracting agent. This permits of handling larger quantities of material in a given plant or set of equipment.

It has been found that the treatment of crude solutions of vitamin B12, such as fermentation broths or partially purified fermentation products, with cyanide has a very desirable effect. Not only does it serve to convert certain related compounds to vitamin B12 itself, but it appears to release the vitamin from some complex form or forms in which much of it exists in these crude sources. The release of the vitamin in this manner places it in a form which is particularly easily extracted and extractable in a particularly pure form considering the large proportion of impurities present in these materials. This greater ease of extraction into the monocarboxylic acid is true whether the material is extracted directly with the acid or after a preliminary extraction with a water-immiscible alcohol-type solvent.

In practice, an aqueous solution derived from a microorganism fermentation broth and containing vitamin B12 values is treated with a water-soluble cyanide salt, such as an alkali metal cyanide, at a somewhat basic pH. The pH is then lowered and excess cyanide is removed by concentrating the solution to some extent, preferably under vacuum. The solution is then treated with an alcohol in the presence of an inorganic sulfate salt. The resulting alcohol solution is extracted with water and the aqueous extract is then treated with the monocarboxylic acid dissolved in a water-immiscible alcohol. Alternatively, a normally liquid, aliphatic, monocarboxylic acid containing substantially between 4 and 14 carbon atoms may be used either alone or in solution in a water-immiscible alcohol as the extracting agent directly on the cyanide-freed aqueous solution.

Describing this new process in more detail and according to preferred procedures, a microorganism fermentation broth is filtered and treated at a basic pH with excess cyanide ion, e. g. sodium or potassium cyanide. The cyanide apparently reacts with the vitamin B12 variants to convert them to B12 itself and to free the vitamin from complexes which have a low degree of extractability. After freeing the solution from excess cyanide which presents a definite hazard to operators, the product is then removed from many of the broth impurities by extraction, in the presence of a neutral water-soluble inorganic salt. It has been found that those inorganic salts which are generally termed "neutral" raise markedly the distribution coefficient of the vitamin and the extraction of this material from the partially purified aqueous solution into certain organic solvents. Particularly useful inorganic salts are sulfates such as ammonium, sodium and magnesium sulfates and the like. The proportion of such salt used in this treatment is not highly critical; however, it is generally best to employ an amount sufficient to form at least about a 5 to 10 percent concentration of salt in the aqueous solution. With concentrations approaching saturation, there may be a tendency to salt out part of the vitamin. This can be avoided by dilution. The organic solvents which are useful as extracting agents are hydroxylated solvents, that is, they contain at least one free hydroxyl group in their structure. Examples of valuable solvents are butanols, pentanols, phenols, cresols, benzyl alcohols, Cellosolves, mixtures of these and the like. Because of their availability and relative cheapness, n-butanol and benzyl alcohol are most often used. If desired, various carrier solvents such as benzene and toluene may also be employed. The ratio of extracting solvent to the aqueous system will depend upon the type of system under treatment, its content of vitamin B12, the type of apparatus used (whether separatory funnels, continuous centrifugal or countercurrent tower extractors or the like) and similar conditions which must be considered in an extraction process. After extraction into the hydroxylic solvent, the vitamin is reextracted into water. The vitamin values are finally extracted from the concentrate or solution, preferably after further addition of a neutral inorganic salt, with one of the aliphatic monocarboxylic acids. The vitamin may be recovered from this acid extract by any desired known means, for instance, by addition of a non-solvent for vitamin B12, preferably a water-immiscible solvent which is reasonably volatile. Among the solvents which are particularly useful for this purpose are hexane, chloroform, methylene chloride, carbon tetrachloride, diethyl ether, heptane, octane, petroleum ether, ligroin, and so forth.

Sufficient non-solvent (e. g. hexane, etc.) is used so that in the presence of water there will result a distinct separate phase which may be removed from the organic solvent phase and which contains the major part of the vitamin completely dissolved. The proportion of the non-solvent required will vary to some extent with the particular solvent system containing the vitamin. However, in general, the lower the molecular weight of the carboxylic acid, the greater the proportion of the non-solvent required. It is advisable to use only such volume of the non-solvent that the vitamin is forced into a discrete aqueous phase of relatively small volume rather than using such a volume of the nonsolvent that the vitamin is separated in the form of a solid. This, however, rarely happens, since the vitamin has quite a high solubility in aqueous systems. In general, a minor proportion of non-solvent equivalent to one-half or less of the volume of the organic acid extracting agent is used for this purpose. Solutions so obtained are clear pink in color and generally of a B12 potency on the dry basis of 25,000 mcg./g. or greater.

The monocarboxylic acid extracting agents which are peculiarly essential to this process are aliphatic in structure, normally liquid at room temperature, and contain from about 4 to about 14 carbon atoms. The aliphatic chain may be straight or branched and part may be in the form of a ring, i. e. a cycloalkyl compound like cyclohexylacetic acid. Among useful compounds may be mentioned: n-caproic acid, cyclohexylvaleric acid, isovaleric acid, octanoic acid, 2-ethylhexoic acid, 2-ethylbutyric acid, capric acid, cyclohexylacetic acid, cyclohexylbutyric acid, n-caprylic acid, and lauric acid. Of these the capric, 2-ethylbutyric and cyclohexylacetic compounds are especially valuable. Other related acids which meet the stated physical and chemical requirements are also satisfactory. In operating the new process, it is best to use a volume of the organic acid equivalent to from about 1/5 to about 1/2 the volume of the aqueous phase being extracted. The efficiency of the process may be increased somewhat by dividing this volume of the organic acid into several smaller portions for successive treatments. The extraction may be conducted in a batchwise manner, or substantially any conventional type of continuous countercurrent extractor may be utilized. The apparatus known as the Podbielniak centrifugal extractor is particularly useful.

Not only are the organic acids useful of themselves as extracting agents, but they may also, and preferably, be first dissolved in or diluted with certain solvents, particularly solvents like water-immiscible or aqueous salt solution-immiscible alcohols. Especially valuable are such solvents as the butanols, the pentanols, benzyl alcohol, mixtures of these and so forth. A combination that has proved very useful is capric acid in butanol, a 10% by weight concentration of the acid being generally satisfactory. In using the carboxylic acids alone for extraction, the distribution coefficient improves as the number of carbon atoms in the carboxylic acid is decreased. The most favorable extraction with this process seems to be obtained using an acid containing about 6 carbons. When a solution of the carboxylic acid in butanol, benzyl alcohol, or other alcohol is used, the maximum extractability seems to occur with an aliphatic acid having about 10 carbons (e. g. capric acid). The best range for this latter type process seems to be with the C-6 to C-14 acids. It should be noted that distribution coefficients in extraction are somewhat sensitive to variations in pH and salt concentration. A somewhat higher pH in the aqueous phase may be used when a solution of an organic carboxylic acid in one of the alcohols is employed instead of the undiluted acid. The optimum pH for extraction with the undiluted carboxylic acid seems to be about 4, whereas with the carboxylic acid-alcohol combinations the extraction improves, with higher pH's. The maximum is generally above about 6.5 and even at pH's as high as 10 the extraction may be quite good. The use of these acid solutions also serves to conserve the organic acid, which often is more expensive than the common solvents.

In operating this process one should best start with solutions containing at least about 5 mcg. of vitamin B12 values per ml. of solution. Vitamin contents of solutions or purified products may be determined by one of the standard microbiological assay methods or, on a sufficiently pure compound, by means of the absorption spectrum. Preferred starting solutions are those which contain about 50 mcg. or more of the vitamin values per gram of solid material. Although lower potency material may be used, the degree of purification obtained will be somewhat reduced. The novel acid extracting agents show a remarkable degree of selectivity in removing the vitamin values without materially affecting various inorganic and organic impurities present therewith in the crude solution. For this extraction it is desirable to adjust the pH of the aqueous solution to a value of 5.0 or lower, while a pH range of from about 3.0 to about 4.5 is particularly suitable to obtain maximum extractability and selectivity. Effectiveness of the extracting acids is also heightened by the presence of a neutral inorganic salt, as previously noted. It is best not to use too high a salt concentration. Hence, it is generally preferred to use not more than about 35% by weight of a neutral inorganic sulfate in the aqueous phase to be extracted, and 15% to 25% of the salt is a particularly satisfactory range.

A particularly preferred embodiment of the present invention resides in the application of this cyanide treatment-carboxylic acid extraction combination in conjunction with and at a special point during certain other purification procedures. An unusually high increase in purity and a notably good recovery is thereby realized. This preferred procedure comprises contacting a vitamin B12-containing microorganism fermentation broth with activated carbon, whereby the vitamin values are adsorbed. The carbon adsorbate is eluted with a mixture of water and an alcohol like butanol. The eluate is preferably then concentrated, as under vacuum, until it contains from about 30 to about 50 mcg. of vitamin per ml., although this step is not necessary. The eluate (or such concentrate) is treated with cyanide ions, e. g. sodium cyanide, to convert the mixture of vitamin variants to vitamin B12 itself and also to release the vitamin from various complexes of low extractability present in the concentrate. Such treatment should be at a neutral to alkaline pH, desirably at about pH 9. Sulfate ions, for instance, ammonium or sodium sulfate, are added, generally at a concentration of about 20 to 35 percent, and the converted vitamin is treated with an alcoholic solvent like benzyl alcohol. The vitamin is then extracted into dilute acid, e. g. water at pH 2, perhaps with the addition of chloroform to the benzyl alcohol phase. It is then best to raise the pH of the aqueous extract to about 5.5 and concentrate the solution under vacuum to remove the butanol and decrease the volume to a certain extent; it is also useful to add more sulfate ions, such as about 15 percent ammonium sulfate. However, these operations are optional. The aqueous vitamin phase is finally extracted into a C-4 to C-14 liquid, aliphatic monocarboxylic acid, preferably at a pH of about 3.0 to 4.5. By addition of hexane or other suitable solvent to the acid extract, the vitamin may be reextracted into water. Any other desired recovery method may alternatively be employed. The extracts so obtained are a clear pink color and quite suitable for use in therapy, either as solutions or as dried and incorporated with other materials. The potency of these materials on a dry basis is generally 50,000 micrograms or more per gram of solids, and in some cases may be as high as 250,000 micrograms per gram. This depends somewhat on the potency of the broth used as starting material and the care with which separations are made at the various stages. A yield of 40 percent or more of the vitamin content of the original fermentation broth is obtained. If desired, these products may be readily converted to crystalline vitamin B12.

The carboxylic acids, or their mixtures with alcohol-type solvents, display unique properties as extracting agents for cyanide-treated vitamin B12 values. Their efficiency is certainly not predictable from the known properties of either the solvents or the acids; nor is the success of the combination of cyanide conversion with carboxylic acid extraction predictable from the known character of the cyanide treatment alone. Unusually high distribution coefficients between water or aqueous salt solutions of the vitaminaceous material and the solvent-acid mixtures are displayed in the new process. The reason for the unexpected effectiveness of the new process is unknown. In some way the acid extraction operates with peculiar ease on the vitamin B12 freed from crude material by cyanide. The particular sequence of steps gives an unexpectedly favorable increase in purity and excellent yields of highly potent vitamin B12 products. Moreover, the process lends itself readily to continuous operation, from at least the stage where a carbon adsorbate is eluted to the point where the pure crystalline vitamin is formed. In between these stages only liquid-liquid extraction processes are employed, which are much more readily handled on a large scale and in a continuous manner than solids processing, require a minimum of labor and losses due to handling. In particular the new method eliminates the use of chromatographic purification steps which are tedious, time-consuming, and expensive, obviates the need for precipitating solid products by the addition of non-solvents to solutions of vitamin B12, and does not yield products which are hygroscopic, too finely divided, and difficult to filter and handle. No extractions of solids with solvents is necessary, a procedure which is also inefficient and slow.

The following examples are given by way of illustration and are not to be considered as the only embodiments of this invention, protection of which is only to be limited by the specific wording of the appended claims.

*Example I*

A clarified *Streptomyces griseus* fermentation broth containing a total of 127.5 grams of vitamin activity (determined by the standard microbiological method) was contacted with 982 kilograms of activated carbon. The resulting slurry was stirred for one-half hour and then filtered. The carbon cake was washed with a small volume of water, and the vitamin B12 material was eluted therefrom by stirring the adsorbate in 3330 gallons of a butanol-water mixture containing about 30 percent of butanol. The eluate was filtered free of carbon and partially evaporated under vacuum at a slightly elevated temperature, thus removing butanol and providing a convenient vitamin concentrate with a dry basis potency of 420 micrograms per gram. Sodium cyanide was added to this aqueous concentrate in the proportion of 30 grams per liter, the pH was adjusted to 9, the solution was allowed to stand about four hours and was concentrated under vacuum at a liquor temperature not exceeding 40° C. and at a pH of 5–6 to about two-thirds of its volume. Sodium sulfate was added to the solution until about a 20% concentration was obtained, and the solution was extracted twice in a Podbielniak centrifugal extractor, first using one-half volume of benzyl alcohol and then one-third volume of benzyl alcohol. Both extracts were clarified by filtering through a filteraid, and contained a total of 87.2 grams of vitamin B12 activity. The extracts were combined and diluted with one-third volume of chloroform.

The resulting solution was extracted with one-half volume of water which had been adjusted to pH 2 with sulfuric acid. The aqueous phase was separated, washed five times with one-fifth volume of butanol, neutralized and concentrated under vacuum to about 200 micrograms of vitamin B12 per milliliter while maintaining the temperature of the solution below about 40° C. The concentrated aqueous extract contained 77.0 grams of vitamin B12 activity. This was treated with 15 percent by weight of ammonium sulfate and then extracted five times, using one-fifth volume of 2-ethylbutyric acid each time. These extracts were combined, clarified by filtration through a filteraid, and diluted with one-quarter volume of hexane. The vitamin was reextracted into four portions of water used successively, each of which was one-quarter the volume of the carboxylic acid-hexane solution.

The final aqueous solution so recovered contained 66.1 grams of vitamin B12 and had a potency of 30,000 micrograms of the vitamin per gram of solids. This represented a 44% overall yield from the fermentation broth, a much better result than has previously been reported for such materials. When this procedure was repeated with other fermentation broths, potencies ranging from 27,000 mcg./g. to over 100,000 mcg./g. were obtained, variations being due to the nature of the fermentation broth, differences in the ease of separation during the extractions and so forth.

*Example II*

A portion of the final product of Example I, having a vitamin B12 potency of 30,000 mcg./g., was treated with 15% by weight of ammonium sulfate. This aqueous solution was again extracted with 2-ethylbutyric acid, the separated organic phase was treated with one-half volume of hexane and the vitamin was reextracted with water. The aqueous extract was concentrated under vacuum to a potency of 8,000 mcg./ml. Sufficient acetone was then added to make the solution 80% acetone. Crystalline vitamin B12 readily separated. It was recrystallized from a mixture of acetone and water to obtain material of U. S. P. purity. An overall yield of 29.1% of the crystalline material from the original fermentation broth was obtained. Such yield can be considerably increased by recovery of the various intermediate mother liquors.

*Example III*

An aqueous concentrate of vitamin B12 was derived from fermentation broth and treated with potassium cyanide by the procedure of Example I. The product, assaying on the dry basis 66,000 mcg./g. was treated with 15% by weight of ammonium sulfate and extracted in a Podbielniak centrifugal extractor with 2-ethylbutyric acid, using one-third the volume of the aqueous solution. The combined acid extracts were conventionally treated to reextract the vitamin B12 values into water. The aqueous concentrate finally obtained in high yield assayed (dry) 200,000 mcg./g., representing a more than three-fold increase in purity by simple liquid-liquid extraction and reextraction.

*Example IV*

Concentrated cyanide-converted vitamin B12 extract was prepared as in Example I, containing a total of 97,300 micrograms of vitamin activity. The aqueous concentrate was treated with 20 grams of ammonium sulfate per 100 milliliters of solution, adjusted to pH 7. and extracted with an equal volume of a 10 percent by weight solution of capric acid in butanol. The resulting butanol layer was extracted with one-third volume of water adjusted to pH 2.0 with sulfuric acid. The freed solvent was used to reextract the aqueous cyanide-converted concentrate at pH 7.0; in this extract the vitamin was again extracted into water at pH 2.0, and this procedure was repeated one more time. The three resulting acidic aqueous extracts were combined, and to each 100 milliliters thereof were added 15 grams of ammonium sulfate. The aqueous salt solution was washed with one-fifth volume of hexane (to remove any residual butanol) and was then extracted with two one-fifth volume portions of 2-ethylbutyric acid. These organic extracts were combined, diluted with one-quarter volume of hexane, and reextracted into acidified water. The final aqueous solution so obtained was a clear, light pink and contained 71,000 micrograms of vitamin B12 at a potency of 47,500 mcg./g. (spectrophotometric assay). This was a yield of 73 percent and represented approximately a 60 percent yield from the original fermentation broth.

It should be noted that in this example two variations of the carboxylic acid extraction step were combined, the first using an alcoholic solution of aliphatic acid and the second using aliphatic acid alone.

*Example V*

Four liters of a concentrated cyanide-converted extract of vitamin B12, similar to that of Example IV and containing 3.08 grams of vitamin B12 activity at a potency of 30,000 mcg./g., were treated with 400 grams of ammonium sulfate. The pH was adjusted to 8.0 and the vitaminaceous solution was extracted with four portions of a 10 percent by weight solution of capric acid in benzyl alcohol (each portion being one-tenth of the volume of the solution). Before use, the capric acid-benzyl alcohol mix was washed with a 10 percent ammonium sulfate solution at an equilibrium pH of 8.0.

The four organic acid-solvent extracts were not combined but each was washed with a one-quarter volume portion of 10 percent ammonium sulfate at an equilibrium pH of 2.0. The purpose of this step was to convert any sodium caprate present to capric acid and thus prevent its later extraction into the aqueous vitamin phase. Each of the washed extracts was filtered through a filteraid and diluted with one-quarter volume of hexane. A one-quarter volume of water was then used to extract the first organic extract first and the other three in succession. This treatment was repeated until no more pink color was transferred to the aqueous phase, four portions of water being required. The resulting aqueous extracts were combined and washed once with one-third volume of hexane and once with one-third volume of chloroform to remove traces of solvent. The product contained 2.64 grams of vitamin B12 having on the dry basis a potency of 116,000 mcg./g. This represented 85.7 percent yield and a four-fold increase in potency.

*Example VI*

A sample of partially refined vitamin B12 was dissolved in sufficient water to give a concentration of about 1,000 micrograms of activity in 50 milliliters of water. The solution was made 10% by weight in ammonium sulfate. The aqueous solution was then extracted with two portions of 10 milliliters each of cyclohexylacetic acid. The cyclohexylacetic acid extracts were combined and diluted with 10 milliliters of hexane. The vitamin was then extracted into a small volume of water. The aqueous solution was dried from the frozen state under vacuum. The vitamin B12 product had been appreciably improved in purity and a high percentage of the activity was recovered in the purified form.

*Example VII*

The process of Example VI was repeated using cyclohexylvaleric acid. Comparable results were obtained.

*Example VIII*

The process of Example VI was repeated using caproic acid with comparable results.

*Example IX*

The process of Example VI was repeated using 2-ethylhexoic acid with comparable results.

What is claimed is:

1. A process for separating vitamin B12-active materials from impurities in an impure aqueous solution containing the same, which comprises treating said solution at a pH of at least 7 with a water soluble cyanide, thereby providing cyanide ions, acidifying the solution, removing excess cyanide, adding to the aqueous solution a neutral, water-soluble, inorganic sulfate, thereafter adding a water-immiscible, hydroxylated organic solvent of limited solubility in the aqueous solution of the group consisting of alkanols having at least four carbon atoms, phenols, benzyl alcohols, Cellosolves and mixtures thereof, extracting the organic solvent solution with water, extracting the vitamin B12-active material from the resulting aqueous extract into a normally liquid, aliphatic monocarboxylic acid containing substantially between 4 and 14 carbon atoms, and thereafter separating the vitamin B12 so produced from the aliphatic monocarboxylic acid.

2. A process for separating vitamin B12-active materials from impurities in an impure aqueous solution containing the same which comprises treating said solution at a neutral to alkaline pH with a water-soluble cyanide, thereby providing cyanide ions, acidifying the solution, adding to the solution a neutral, water-soluble inorganic sulfate, thereafter extracting the vitamin B12-active materials from the solution into a normally liquid, aliphatic monocarboxylic acid containing substantially between 4 and 14 carbon atoms, diluting the resulting carboxylic acid extract with up to one-half its volume of a vitamin B12-non-solvent selected from the group consisting of hexane, chloroform, methylene chloride, carbon tetrachloride, diethyl ether, heptane, octane, petroleum ether, and ligroin, and extracting the vitamin B12-active materials from the carboxylic acid-diluent solution directly into water.

3. The process of claim 1 wherein the source of cyanide ions is an alkali metal cyanide.

4. The process of claim 1 wherein the monocarboxylic acid is first dissolved in a water-immiscible alcohol.

5. A process for the purification of vitamin B12-active materials obtained from microorganism fermentation broth which consists of adsorbing said values on activated carbon, eluting the carbon adsorbate with an alcohol-water mixture, removing said alcohol, treating the aqueous eluate at a pH of at least 7 with a water-soluble cyanide, thereby providing cyanide ions, acidifying the solution, removing excess cyanide, adding to the aqueous solution a neutral, water-soluble, inorganic sulfate salt selected from the group consisting of sodium and ammonium sulfates, thereafter adding a water-immiscible, hydroxylated organic solvent selected from the group consisting of benzyl alcohol and butanol, extracting the resulting solution with water, reextracting the vitamin B12-active material from the resulting aqueous extract into a normally liquid, aliphatic monocarboxylic acid containing substantially between 4 and 14 carbon atoms, diluting the resulting carboxylic acid extract with up to ½ its volume of a vitamin B12 non-solvent selected from the group consisting of hexane, chloroform, methylene chloride, carbon tetrachloride, diethyl ether, heptane, octane, petroleum ether, and ligroin, and reextracting purified vitamin B12 from the resulting carboxylic acid-diluent solution directly into water.

6. The process of claim 5 wherein the monocarboxylic acid is capric acid.

7. The process of claim 5 wherein the monocarboxylic acid is cyclohexylacetic acid.

8. The process of claim 5 wherein the monocarboxylic acid is 2-ethylhexoic acid.

9. The process of claim 5 wherein the monocarboxylic acid is cyclohexylvaleric acid.

10. The process of claim 5 wherein the monocarboxylic acid is n-caproic acid.

References Cited in the file of this patent
UNITED STATES PATENTS

| | | | |
|---|---|---|---|
| 2,530,416 | Wolf | Nov. 21, | 1950 |
| 2,652,357 | Ford | Sept. 15, | 1953 |